(12) United States Patent  
Rosati et al.

(10) Patent No.: US 11,936,653 B2  
(45) Date of Patent: Mar. 19, 2024

(54) REVISION OF ACCESS CONTROL PROCESS ACCORDING TO VIRTUAL ROLES OF SUBJECTS BASED ON ATTRIBUTES THEREOF

(71) Applicant: INTERNATIONAL BUSINESS MACHINES CORPORATION, Armonk, NY (US)

(72) Inventors: Leonardo Rosati, Rome (IT); Alberto Novello, Rome (IT); Fabrizio Petriconi, Rome (IT); Anna Filomena Bufi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 17/248,974

(22) Filed: Feb. 16, 2021

(65) Prior Publication Data

US 2021/0288963 A1 Sep. 16, 2021

(30) Foreign Application Priority Data

Mar. 12, 2020 (EP) .................................... 20162678

(51) Int. Cl.
*H04L 9/40* (2022.01)
(52) U.S. Cl.
CPC .............. *H04L 63/10* (2013.01); *H04L 63/20* (2013.01)
(58) Field of Classification Search
CPC ....... H04L 63/10; H04L 63/20; H04L 63/205; H04L 63/104
See application file for complete search history.

(56) References Cited

U.S. PATENT DOCUMENTS

| 8,533,168 | B2 | 9/2013 | Kuehr-McLaren |
| 8,881,226 | B2 | 11/2014 | Giambiagi |
| 9,189,644 | B2 | 11/2015 | Kling |
| 9,264,451 | B2 | 2/2016 | Chari |
| 2013/0067538 | A1 | 3/2013 | Dharmarajan |
| 2013/0081105 | A1 | 3/2013 | Giambiagi |
| 2013/0227638 | A1 | 8/2013 | Giambiagi |

(Continued)

FOREIGN PATENT DOCUMENTS

CN 107046530 A * 8/2017 ............. G06F 21/55

OTHER PUBLICATIONS

C. Cotrini, T. Weghorn and D. Basin, "Mining ABAC Rules from Sparse Logs," 2018 IEEE European Symposium on Security and Privacy (EuroS&P), London, UK, 2018, pp. 31-46. (Year: 2018).*

(Continued)

*Primary Examiner* — Michael R Vaughan
(74) *Attorney, Agent, or Firm* — Elliot J. Shine

(57) ABSTRACT

A solution is proposed for reviewing a control of access in an information technology system. A corresponding method comprises retrieving an indication of granted accesses to objects, being granted to subjects according to policies based on attributes. Virtual roles (each defined by one or more of the attributes) are determined according to a correlation among access types of the granted accesses and the attributes of the subjects being granted them. A computer program and a computer program product for performing the method are also proposed. Moreover, a system for implementing the method is proposed.

20 Claims, 9 Drawing Sheets

(56) References Cited

U.S. PATENT DOCUMENTS

| | | | | |
|---|---|---|---|---|
| 2013/0291059 A1* | 10/2013 | Giambiagi | ............. | H04L 63/20 |
| | | | | 726/1 |
| 2014/0047501 A1* | 2/2014 | Rissanen | ................ | H04L 63/10 |
| | | | | 726/1 |
| 2015/0082377 A1 | 3/2015 | Chari | | |
| 2015/0269383 A1* | 9/2015 | Lang | ....................... | G06F 21/57 |
| | | | | 726/1 |
| 2018/0114015 A1* | 4/2018 | Nuseibeh | ............ | H04L 67/1095 |
| 2019/0258811 A1 | 8/2019 | Ferraiolo | | |

OTHER PUBLICATIONS

Chari, et al., "Generating Attribute Based Access Control Policies From Existing Identity Management Systems," Application and Drawings, Filed on Sep. 17, 2013, 20 Pages, Related U.S. Appl. No. 61/878,644.

Servos, et al., "Current Research and Open Problems in Attribute-Based Access Control," ACM Computing Surveys, Jan. 2017, 43 pages, 49(4), ResearchGate, Project: HGABAC, DOI: 10.1145/3007204, Retrieved from the Internet: <URL: https://www.researchgate.net/publication/312039271_Current_Research_and_Open_Problems_in_Attribute-Based_Access_Control>.

Wikipedia, "Attribute-based access control," Wikipedia, the free encyclopedia, [accessed on Dec. 9, 2020], 7 pages, Retrieved from the Internet: <URL: https://en.wikipedia.org/wiki/Attribute-based_access_control>.

Wikipedia, "Role-based access control," Wikipedia, the free encyclopedia, [accessed on Dec. 9, 2020], 14 pages, Retrieved from the Internet: <URL: https://it.wikipedia.org/wiki/Role-based_access_control>.

Zhang, et al., "An Attribute-Based Access Matrix Model," Proceedings of the 2005 ACM Symposium on Applied Computing (SAC) conference paper, Jan. 2005, pp. 359-363, ResearchGate, Santa Fe, NM, US, DOI: 10.1145/1066677.1066760, Retrieved from the Internet: <URL: https://www.researchgate.net/publication/221001809>.

Rosati, et al., "Revision of Access Control Process According to Virtual Roles of Subjects Based on Attributes Thereof," Application and Drawings, Filed on Mar. 12, 2020, 41 Pages, Related EP Patent Application Serial No. 20162678.5.

* cited by examiner

205

|      | GAT1 | GAT2 | GAT3 | GAT4 | GAT5 | GAT6 | GAT7 | GAT8 | GAT9 | GAT10 |
|------|------|------|------|------|------|------|------|------|------|-------|
| ATR1 | 30   | 0    | 0    | 0    | 2    | 0    | 0    | 0    | 3    | 0     |
| ATR2 | 30   | 40   | 40   | 10   | 30   | 15   | 30   | 0    | 50   | 40    |
| ATR3 | 0    | 2    | 40   | 10   | 3    | 0    | 3    | 0    | 0    | 5     |
| ATR4 | 40   | 40   | 36   | 0    | 30   | 40   | 50   | 50   | 50   | 40    |
| ATR5 | 0    | 50   | 0    | 0    | 30   | 40   | 60   | 60   | 50   | 40    |
| ATR6 | 1    | 0    | 0    | 10   | 0    | 0    | 0    | 0    | 0    | 0     |

|      | GAT1   | GAT2   | GAT3   | GAT4   | GAT5   | GAT6   | GAT7   | GAT8   | GAT9   | GAT10  |
|------|--------|--------|--------|--------|--------|--------|--------|--------|--------|--------|
| ATR1 | 37,13% | 0,00%  | 0,00%  | 0,00%  | 2,63%  | 0,00%  | 0,00%  | 0,00%  | 2,45%  | 0,00%  |
| ATR2 | 37,13% | 37,88% | 43,10% | 41,67% | 39,47% | 19,74% | 26,22% | 0,00%  | 40,85% | 40,00% |
| ATR3 | 0,00%  | 1,89%  | 43,10% | 41,67% | 3,95%  | 0,00%  | 2,62%  | 0,00%  | 0,00%  | 5,00%  |
| ATR4 | 49,50% | 37,88% | 38,79% | 0,00%  | 39,47% | 52,63% | 43,71% | 56,82% | 40,85% | 40,00% |
| ATR5 | 0,00%  | 47,35% | 0,00%  | 0,00%  | 39,47% | 52,63% | 52,45% | 68,18% | 40,85% | 40,00% |
| ATR6 | 1,24%  | 0,00%  | 0,00%  | 41,67% | 0,00%  | 0,00%  | 0,00%  | 0,00%  | 0,00%  | 0,00%  |

|      | GAT1 | GAT2 | GAT3 | GAT4 | GAT5 | GAT6 | GAT7 | GAT8 | GAT9 | GAT10 | SI  | CFi |
|------|------|------|------|------|------|------|------|------|------|-------|-----|-----|
| ATR1 | X    |      |      |      |      |      |      |      |      |       | 10% |     |
| ATR2 | X    | X    | X    | X    | X    |      |      |      | X    | X     | 70% | X   |
| ATR3 |      |      | X    | X    |      |      |      |      |      |       | 20% |     |
| ATR4 | X    | X    | X    |      | X    | X    | X    | X    | X    | X     | 90% | X   |
| ATR5 |      | X    |      |      | X    | X    | X    | X    | X    | X     | 70% | X   |
| ATR6 |      |      |      | X    |      |      |      |      |      |       | 10% |     |

FIG.2C

| CGm | CIm |
|---|---|
| CG1=ART2+ART4 | 60,00% |
| CG2=ATR2+ATR5 | 40,00% |
| CG3=ATR4+ATR5 | 70,00% |
| CG4=ATR2+ATR4+ATR5 | 40,00% |

— 220

| VGn | VLn |
|---|---|
| ATR2+¬ATR4 | VL1 |
| ART4+¬ATR2+¬ATR5 | VL2 |
| ART5+¬ATR4 | VL3 |
| ATR2+ATR4 | VL4 |
| ATR4+ATR5 | VL5 |

— 225

230

REVISION OF ACCESS CONTROL PROCESS ACCORDING TO VIRTUAL ROLES OF SUBJECTS BASED ON ATTRIBUTES THEREOF

BACKGROUND

The present disclosure relates to the information technology field. More specifically, this disclosure relates to an access control process in information technology systems.

The background of the present disclosure is hereinafter introduced with the discussion of techniques relating to its context. However, even when this discussion refers to documents, acts, properties and the like, it does not suggest or represent that the discussed techniques are part of the prior art or are common general knowledge in the field relevant to the present disclosure.

Information technology systems generally implement an access control process to selectively restrict access to (protected) resources thereof (for example, programs, data and devices). Particularly, the access control process is used to permit/prohibit activities that may be performed on the resources (commonly referred to as objects) by different entities, for example, (human) users (commonly referred to as subjects). The access control process is aimed at permitting the (right) subjects to perform the (right) activities at right times and for right reasons; this avoids (or at least significantly reduces) the risk that unauthorized subjects might perform undesired (and generally dangerous) activities in the information technology system.

The access control process is typically implemented by Identity and Access Management (IAM) applications. In general, any IAM application provides authentication, authorization and audit functionalities. Particularly, the authentication functionality associates each subject with a digital identify used to verify his/her identity and then to operate in the information technology system (such as via userID and password). The authorization functionality specifies an entailment of each subject to perform specific activities on specific objects and enforces the access to the objects by the subjects in compliance with their entitlements (such as a user with a read permission to a file may open but not update it). The audit functionality tracks activities that have been performed with respect to the control access process (such as granted/denied accesses) for their review and possible independent examination (such as to verify compliance with security/statutory regulations).

The access control process may be based on different authorization models. For example, in a Role Based Access Control (RBAC) model different roles define permissions to perform activities on the objects; each subject is assigned one or more roles, and then the corresponding permissions. The RBAC model allows mastering the complexity of the access control process in very large organizations (such as with thousands of objects/subjects). However, in the RBAC model it is quite difficult to cope with dynamic changes, since this requires a complex and time consuming mining activity to discover typical patterns of subjects-to-objects mapping for use in updating the roles and their assignments to the subjects.

Alternatively, in an Attribute Based Access Control (ABAC) model, also known as Policy Based Access Control (PBAC) or Claims Based Access Control (CBAC), different (provisioning) policies define permissions to perform activities on the objects according to attributes; each subject is assigned the permissions of the policies which are satisfied by the corresponding attributes. The ABAC model is very flexible, since it self-adapts automatically to the characteristics of changing objects/subjects.

The governance of the access control process requires a periodic review thereof. Particularly, the review involves re-certifying the entitlements to determine whether they are still appropriate or not (and then they are to be approved or revoked, respectively). The re-certification is relatively straightforward in the RBAC model. Indeed, in this case the roles are prescriptive of the corresponding permissions; therefore, it is quite easy to understand an authorization context of most of the permissions associated with well-known roles, with any exceptions requiring deeper investigations that are immediately apparent. Conversely, in the ABAC model the authorization context of the permissions is embedded within the policies; therefore, a reversal of the logic of the policies is required to understand it. However, the policies are generally quite complex (with many attributes, glue code and custom code mixed together), so that their interpretation is very difficult, if not impossible.

As a result, in the ABAC model the re-certification is generally performed almost blindly, without an effective knowledge of the authorization context. In this condition, the re-certification is often simply based on feelings, with the entitlements that may be approved/revoked without any meaningful explanation (down to the indiscriminate approval of all of them).

Therefore, it is possible to have subjects with entitlements that are unnecessary, undesired or even dangerous. All of the above may adversely affect several business aspects and it may involve serious security exposures.

Moreover, the missing rationale in the re-certification of the entitlements is indicative of poor governance of the access control process. This may cause negative audit findings, with the risk of non-compliance with regulatory requirements.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of determining virtual roles based on the attributes of the subjects.

Particularly, an embodiment provides a method for reviewing a control of access in an information technology system. The method comprises retrieving an indication of granted accesses to objects, being granted to subjects according to policies based on attributes. Virtual roles (each defined by one or more of the attributes) are determined according to a correlation among access types of the granted accesses and the attributes of the subjects being granted them.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

Particularly:

FIG. 2A-FIG. 2F show an exemplary scenario of application of the solution according to an embodiment of the present disclosure.

DETAILED DESCRIPTION

With reference in particular to FIG. 1A-FIG. 1D, the general principles are shown of the solution according to an embodiment of the present disclosure.

Figure 1A:
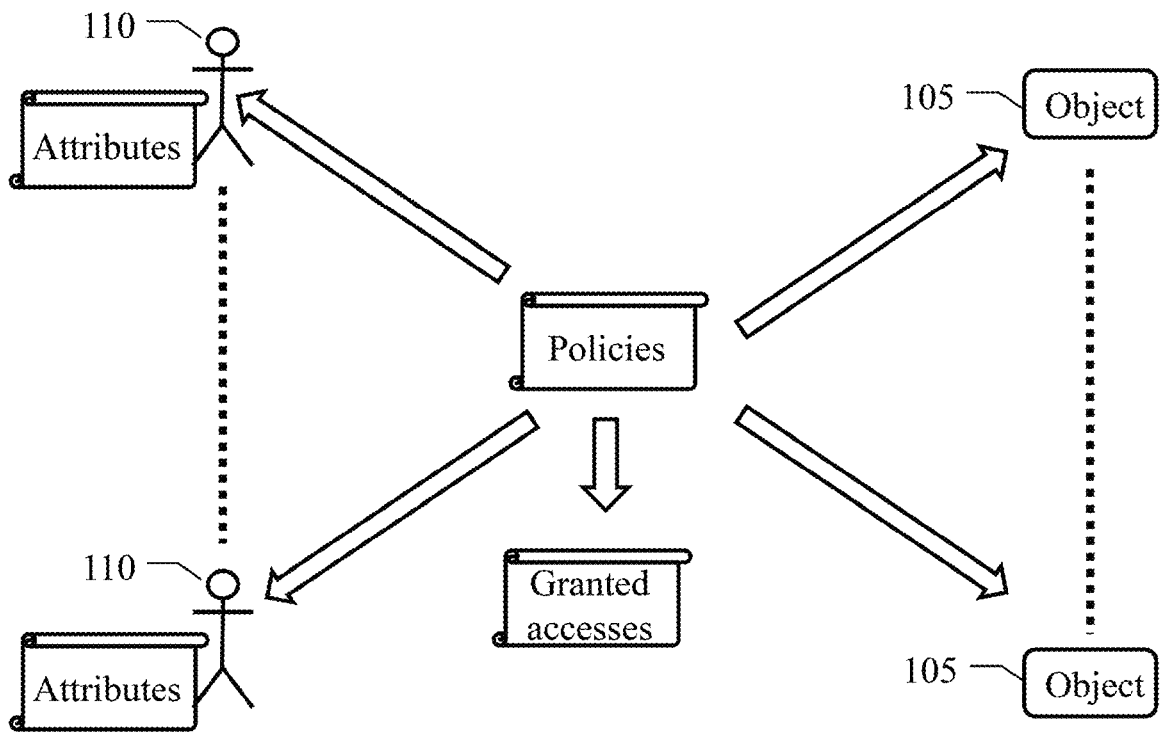
FIG. 1A-FIG. 1D show the general principles of the solution according to an embodiment of the present disclosure.

Starting from FIG. 1A, an access control process is implemented to control access to objects 105 (for example, resources of an information technology system) by subjects 110 (for example, users operating in the information technology system via corresponding digital identities). The access control process is based on the ABAC model, wherein (provisioning) policies define permissions that grant/deny different types of access (access types) to perform corresponding activities on the objects 105; the policies are based on several attributes, comprising attributes of the subjects 110. The subjects 110 are granted accesses to the resources 105 (granted accesses) according to the permissions that are assigned thereto by the policies being satisfied by their attributes. The granted accesses that are granted to the subjects 110 over time are retrieved. For example, for each attribute there is counted the number of granted accesses of each access type that are granted to the subjects 110 having this attribute.

Figure 1B:
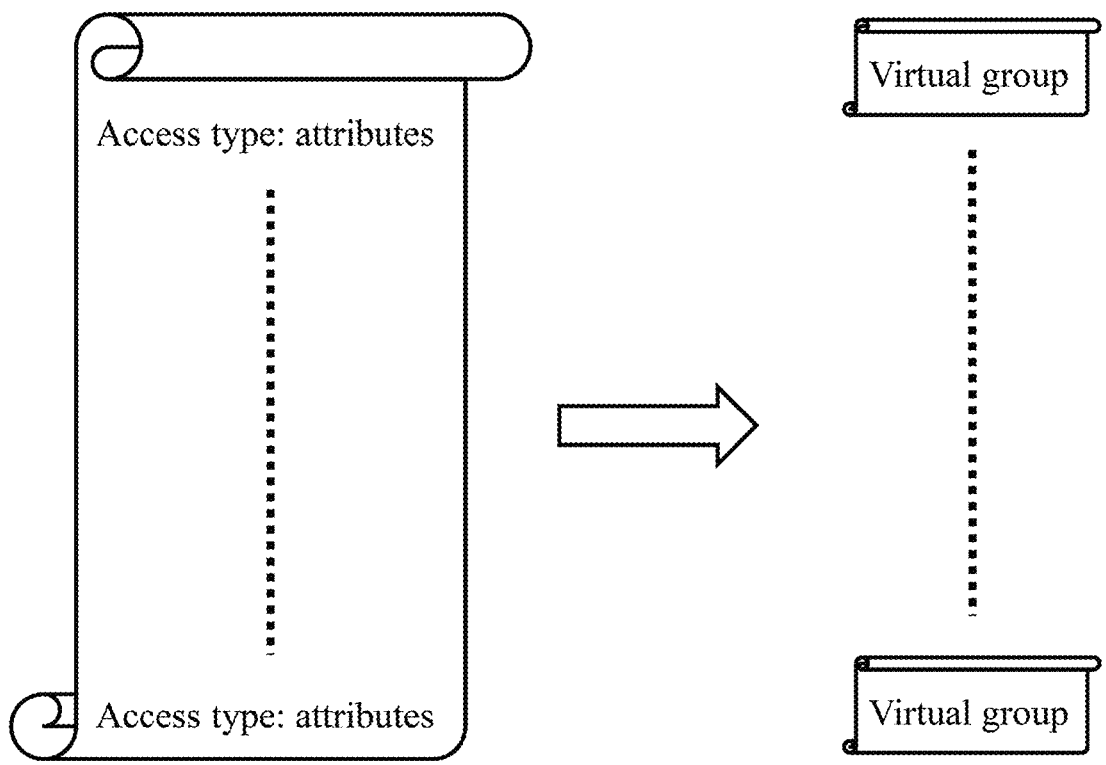

Moving to FIG. 1B, one or more groups of the attributes (referred to as virtual groups) are determined according to a correlation among the access types and the attributes of the subjects that have been granted the corresponding granted accesses. For example, the virtual groups are selected as the ones whose attributes have a high number of access types (which the attributes contribute to grant when the subjects 110 have them) in common.

Figure 1C:
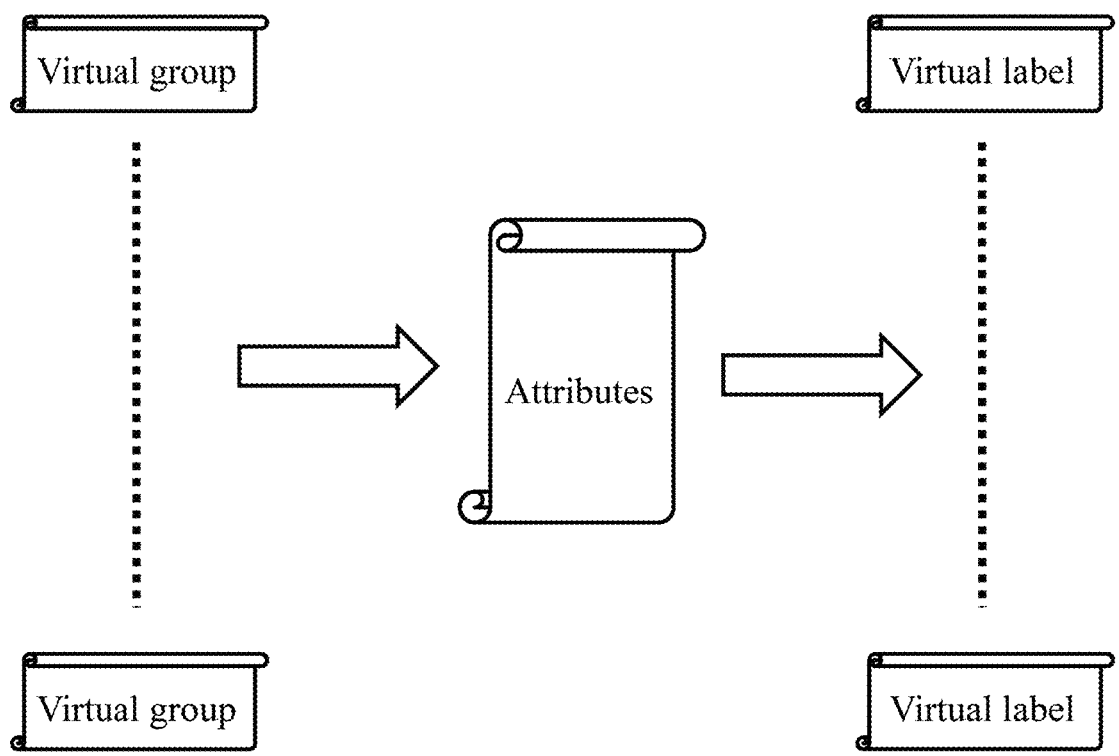

Moving to FIG. 1C, corresponding virtual roles are determined for the virtual groups according to their attributes. For example, virtual labels are assigned to the virtual roles by combining expressions derived from their attributes.

Figure 1D:
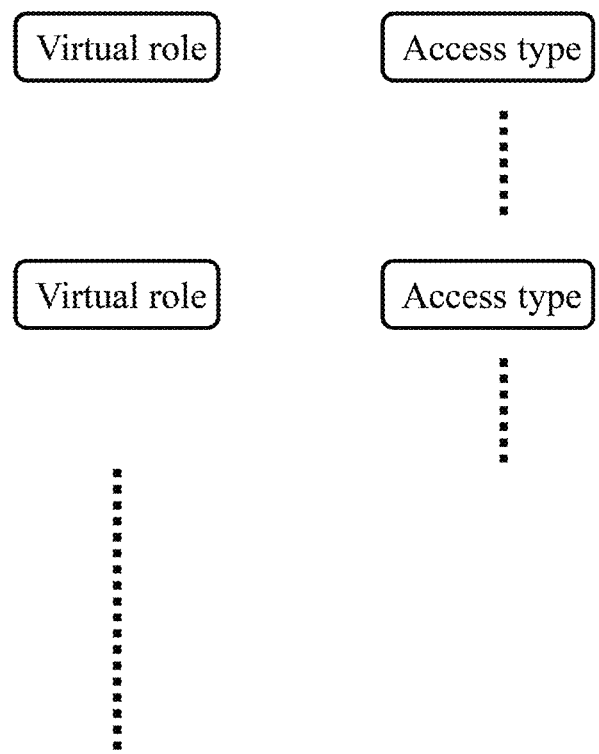

Moving to FIG. 1D, review information is output; the review information comprises an indication of the virtual roles with the corresponding access types. For example, a dashboard is displayed listing the subjects, their virtual roles and the access types that have been granted thereto. The review information is used for reviewing the policies accordingly. For example, each granted access may be re-certified by approving or revoking it (with the policies that are updated accordingly if necessary).

The above-described solution adds an authorization context to the granted accesses thanks to the virtual roles. As a result, the re-certification may be performed with a meaningful explanation of each approval/revocation. This result is achieved in a quite straightforward way in the ABAC model as well (without requiring any reversal of the logic of the policies).

All of the above avoids (or at least significantly reduces) the risk of having entitlements that are unnecessary, undesired or even dangerous. This has a beneficial impact on business aspects and security.

Moreover, the provided rationale in the re-certification is indicative of good governance of the access control process. This facilitates the achievement of positive audit findings, and particularly the compliance with regulatory requirements.

Figures 2D, 2E, 2F:
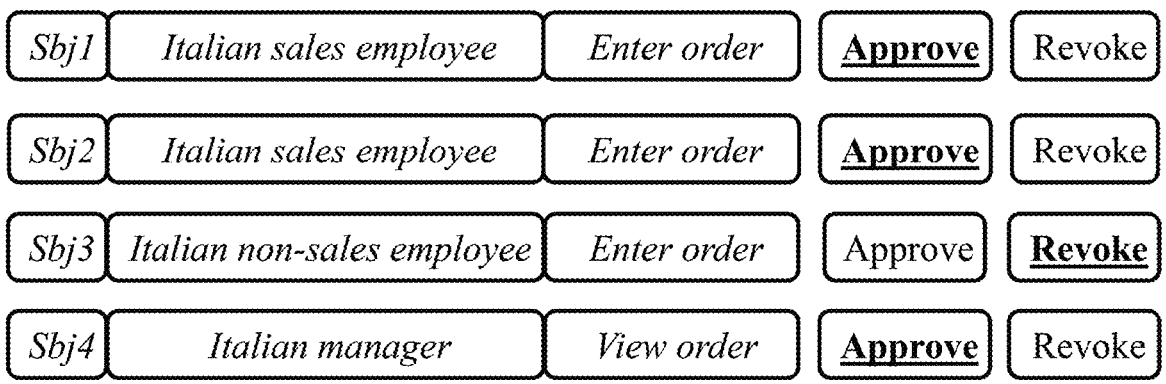

With reference now to FIG. 2A-FIG. 2F, an exemplary scenario is shown of application of the solution according to an embodiment of the present disclosure Starting from FIG. 2A, a counter table 205 is shown. The counter table 205 comprises corresponding rows for all the attributes of the subjects $ATR_i$ (with i=1 . . . 6 in the example at issue) and corresponding columns for all the access types $GAT_j$ of the granted accesses (with j=1 . . . 12 in the example at issue). Each cell of the counter table 205 at the intersection of a row and a column (identified by the corresponding attribute $ATR_i$ and access type $GAT_j$) contains an occurrence counter $OC_{ij}$; the occurrence counter $OC_{ij}$ is equal to the number of the granted accesses of the access type $GAT_j$ that have been granted to the subjects having the attribute $ATR_i$.

Moving to FIG. 2B, a relevance table 210 is shown. The relevance table 210 comprises corresponding rows for the attributes $ATR_i$ and corresponding columns for the access types $GAT_j$ as above. Each cell of the relevance table 210 at the intersection of a row and a column (identified by the corresponding attribute $ATR_i$ and access type $GAT_j$) now contains a relevance indicator $Rl_{ij}$ of the attribute $ATR_i$ for the access type $GAT_j$; the relevance indicator $Rl_{ij}$ is equal to a percentage of the corresponding occurrence counter $OC_{ij}$ (in the same cell of the counter table 205 of FIG. 2A) with respect to a total of the occurrence counters $OC_{ij}$ of the access type $GAT_j$ (in the corresponding column of the counter table 205 of FIG. 2A).

Moving to FIG. 2C, a spreading table 215 is shown. The spreading table 215 comprises corresponding rows for the attributes $ATR_i$ and corresponding columns for the access types $GAT_j$ as above. Each cell of the spreading table 215 at the intersection of a row and a column (identified by the corresponding attribute $ATR_i$ and access type $GAT_j$) now contains a relevance flag $RF_{ij}$. The relevance flag $RF_{ij}$ is asserted (for example, to the value 1, X in the figure) if the attribute $ATR_i$ is relevant for the access type $GAT_j$ and it is deasserted otherwise(for example, to the value 0, empty in the figure); the attribute $ATR_i$ is deemed relevant for the access type $GAT_j$ when the corresponding relevance indicator $Rl_{ij}$ (in the same cell of the relevance table 210 of FIG.

2B) reaches a relevance threshold RTj, for example, equal to a percentage of the highest relevance indicator Rlij for the access type GATj (in the corresponding column of the relevance table 210 of FIG. 2B). Therefore, the relevant attributes ATRi for each access type GATj are the ones that are more likely to have affected the granting of the corresponding granted accesses. For example, let us consider a very simple case with granted accesses of an access type Open_myFile that have been granted 4 times to subjects having the attributes isMgr,Location=IT, 2 times to subjects having the attributes isMgr,Location=US, 2 times to subjects having the attributes isMgr,Location=UK and 2 times to subjects having the attributes isMgr,Location=FR. The corresponding relevance indicators Rlij are 10/10=100% for the attribute isMgr, 2/10=20% for the attribute Location=IT, 2/10=20% for the attribute Location=US, 2/10=20% for the attribute Location=UK and 2/10=20% for the attribute Location=FR. Therefore, the only relevant attribute (having the relevance indicator higher than the relevance threshold 100*0,75=75%) is the attribute isMgr. Indeed, in this case it is very likely that the granted accesses of the access type Open_myFile have been granted to the subjects because they have the (relevant) attribute isMgr, whereas the other attributes thereof (i.e., Location=IT, Location=US, Location=UK and Location=FR) are irrelevant for this purpose.

The relevance table 215 has two additional columns. The cells of these columns in each row (identified by the corresponding attribute ATRi) contain a spreading indicator SIi and a candidate flag CFi of the attribute ATRi. The spreading indicator SIi is equal to a percentage of a total number of the access types GATj for which the attribute ATRi is relevant (X in the corresponding cells) with respect to a total number of the access types GATj (number of their columns). The candidate flag CFi is asserted (for example, to the value 1, X in the figure) if the attribute ATRi is candidate for combination with other attributes for the definition of the virtual roles and it is deasserted otherwise (for example, to the value 0, empty in the figure). The attribute ATRi is deemed candidate for combination when the corresponding spreading indicator SIi reaches a spreading threshold ST (for example, 40-60%, such as 50%). Therefore, the candidate attributes (in this case, ATR2, ATR4 and ATR5) are the ones that are more likely to have commonalities in terms of the corresponding access types GATj. The search of the virtual roles may then be limited to the combinations of the relevant attributes ATRi only, so as to make it affordable from a computational complexity point of view, especially in very large information technology systems with hundreds of attributes and access types.

Moving to FIG. 2D, a commonality table 220 is shown. The commonality table 220 comprises corresponding rows for candidate groups CGm (for the virtual groups of the virtual roles) defined by all the possible subsets of the candidate attributes ATRi (X in the corresponding rows of the spreading table 215 of FIG. 2C) having a cardinality higher than 1, i.e., CG1=ATR2+ATR4, CG2=ATR2+ATR5, CG3=ATR4+ATR5 and CG4=ATR2+ATR4+ATR5 in the example at issue. The further cell of the commonality table 220 in each row (identified by its candidate group CGm) contains a commonality indicator CIm; the commonality indicator CIm is equal to a percentage of the total number of the access types GATj for which all the attributes ATRi of the candidate group CGm are relevant (X in the same column for all the corresponding rows in the spreading table 215 of FIG. 2C) with respect to a total number of the access types GATj (number of their columns).

Moving to FIG. 2E, a role table 225 is shown. The role table 225 comprises corresponding rows for the virtual roles. The virtual roles are defined by the corresponding virtual groups VGn, which are equal to the candidate attributes alone, i.e., VG1=ATR2, VG2=ATR4 and VG3=ATR5 in the example at issue, and to the candidate groups CGm whose commonality indicators CIm (in the corresponding rows of the commonality table 220 of FIG. 2D) reach a commonality threshold CT (for example, 40-60%, such as 50%), i.e., VG4=ATR2+ATR4 and VG5=ATR4+ATR5 in the example at issue. The further cell of the role table 225 in each row (identified by its virtual group VGn) contains the virtual label VLn of the virtual role defined by the virtual group VGn.

The virtual groups VGn are then completed to make the corresponding virtual roles disjoint. This operation is applied to each (smaller) virtual group VGn having a cardinality lower than a maximum cardinality of the virtual groups VGn, i.e., the smaller virtual groups VG1=ATR2, VG2=ATR4 and VG3=ATR5 with cardinality lower than 2 in the example at issue. For each smaller virtual group VGn, if all its attributes ATRi are comprised in any (bigger) virtual group VGn having a higher cardinality, the smaller virtual group VGn is completed by adding a negation of the (additional) attributes ATRi of the bigger virtual group VGn different from the attributes of the smaller virtual group VGn, i.e., VG1=ATR2+¬1ATR4, VG2=ATR4+¬1ATR2+¬1ATR5 and VG3=ATR5+¬ATR4 in the example at issue. For example, let us consider the virtual roles defined by the virtual groups isMgr, location=IT, dept=sales, isMgr+location=IT and location=IT+dept=sales. In this case, the (smaller) virtual role defined by the virtual group isMgr (comprised in the bigger virtual group isMgr+location=IT) is completed by adding the attribute location< >IT so as to become isMgr+location< >IT, the smaller virtual role defined by the virtual group location=IT (comprised in the bigger virtual groups isMgr+location=IT and location=IT+dept=sales) is completed by adding the attributes isNotMgr and dept< > sales so as to become location=IT+isNotMgr+dept< >sales and the smaller virtual role defined by the virtual group dept=sales (comprised in the bigger virtual group location=IT+dept=sales) is completed by adding the attribute location< >IT so as to become dept=sales+location< >IT.

The virtual label VLn is assigned to the virtual role according to the attributes of its (possibly completed) virtual group VGn. Particularly, the virtual label VLn is determined by combining expressions corresponding to the attributes; the expression of each attribute is determined by translating it into natural language, with the addition of a default substantive (such as "employee") when none is comprised in the virtual label VLn so obtained. In the case of the above-mentioned virtual groups, the following virtual labels may be assigned to their virtual roles:

isMgr+location< >IT: non-Italian manager,
location=IT+isNotMgr+dept< >sales: Italian non-sales non-manager,
location=IT+dept=sales: Italian non-sales employee,
isMgr+location=IT: Italian manager,
location=IT+dept=sales: Italian sales employee.

Moving to FIG. 2F, an exemplary review window 230 is shown that may be used for reviewing the control access process. The review window 230 lists the subjects each with the virtual label of its virtual role (if any); for each subject, the review window 230 then lists the access types of the granted accesses that have been granted to the subject, each with two push-buttons for accepting or revoking the access type to the subject. In this way, a reviewer may understand from the virtual roles of the subjects the business reasons behind the grant of the access types thereto; this allows taking informed decisions during the re-certification of the access control process. In the example shown in the figure, the subjects SBJ1,SBJ2 having the role Italian sales employee and the subject SBJ3 having the role Italian non-sales employee have been granted the access type Enter order, and the subject SBJ4 having the role Italian manager has been granted the access type View order. Therefore, the access type Enter order may be approved for the subjects SBJ1,SBJ2 (Italian sales employee) and it may be revoked for the subject SBJ3 (Italian non-sales employee); likewise, the access type View order may be approved for the subject SBJ4 (Italian manager).

Figure 3:
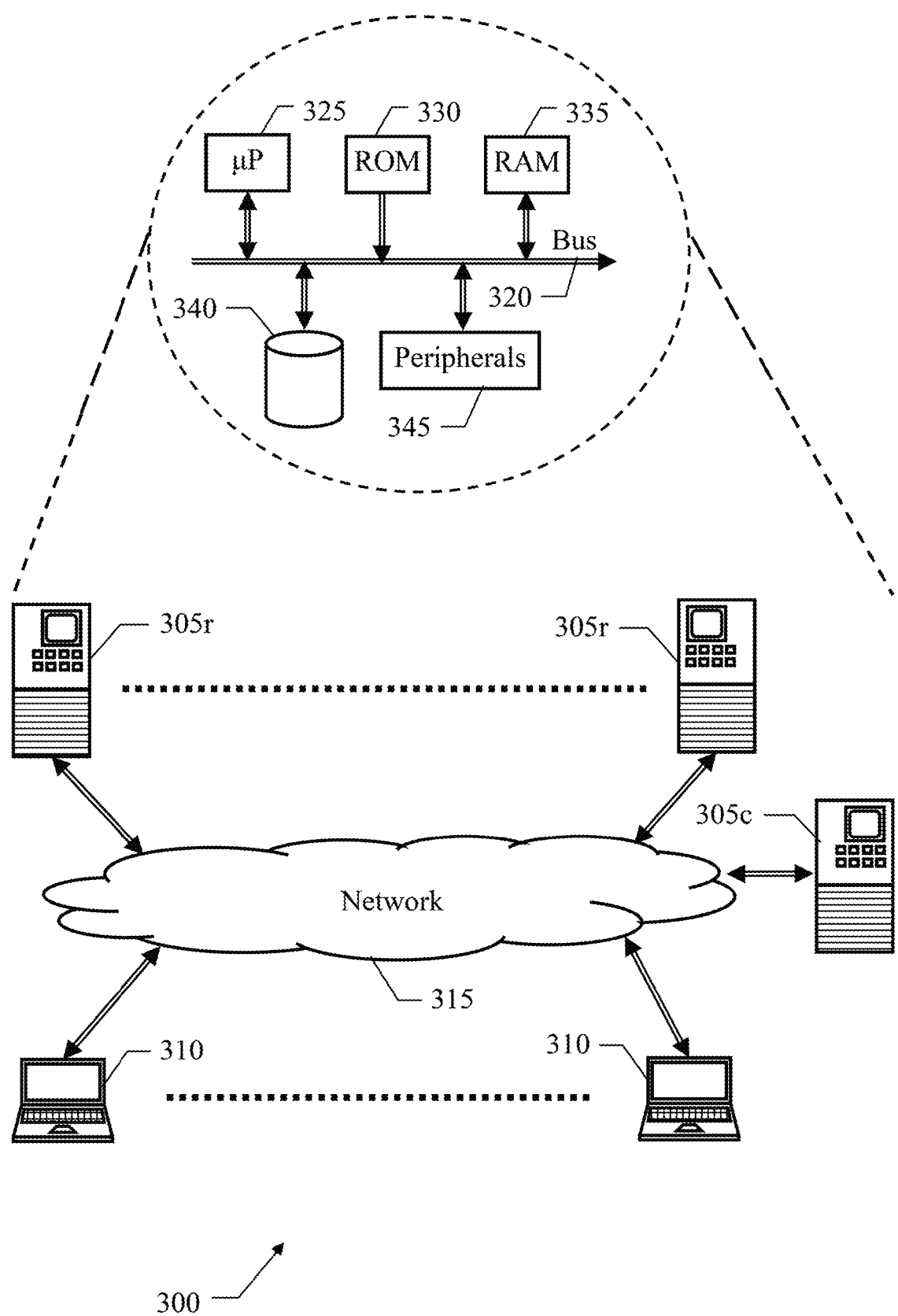
FIG. 3 shows a schematic block diagram of an information technology system wherein the solution according to an embodiment of the present disclosure may be practiced.

With reference now to FIG. 3, a schematic block diagram is shown of an information technology system 300 wherein the solution according to an embodiment of the present disclosure may be practiced.

The information technology system 300 has a distributed architecture based on a client/server model. Particularly, server computing machines, or simply servers 305r,305c provide services to client computing machines, or simply clients 310. For this purpose, the clients 310 communicate with the servers 305r,305c over a (communication) network 315 (for example, based on the Internet). The servers 305r, 305c comprise one or more resource servers 305r and a control server 305c (or more). The resource servers 305r implement services (for example, CRM, LDAP, SIEM, SaaS, e-mail and so on) providing access to hardware and/or software resources (for example, devices, machines, files, programs, web pages and so on), which define the objects whose access has to be controlled. The control server 305c controls the access to the objects (of the resource servers 305r), by permitting it only to (authorized) subjects defined by users of the clients 310 (for example, to use devices, start/stop machines, read/write files, run programs, download contents and so on).

Each of the above-described computing machines (i.e., servers 305r,305c and clients 310) comprises several units that are connected among them through a bus structure 320 with one or more levels (with an architecture that is suitably scaled according to the type of the computing machine 305r,305c,310). Particularly, one or more microprocessors (i.tP) 325 provide the logical capabilities of the computing machine 305r,305c,310; a non-volatile memory (ROM) 330 stores basic code for a bootstrap of the computing machine 305r,305c,310 and a volatile memory (RAM) 335 is used as a working memory by the microprocessors 325. The computing machine 305r,305c,310 is provided with a mass-memory 340 for storing programs and data (for example, storage devices of data centers wherein they are implemented for the servers 305r,305c and hard disks for the clients 310). Moreover, the computing machine 305r,305c, 310 comprises a number of controllers for peripherals, or Input/Output (I/O) units, 345; for example, the peripherals 345 of each server 305r,305c comprise a network adapter for plugging the server 305r,305c into the corresponding data center and then connecting it to a console of the data center for its control (for example, a personal computer, also provided with a drive for reading/writing removable storage units, such as USB keys) and to a switch/router sub-system of the data center for its communication with the network 315, whereas the peripherals 345 of each client 310 comprise a keyboard, a mouse, a monitor, a network adapter for connecting to the network 315 and a drive for reading/writing removable storage units as above.

Figure 4:
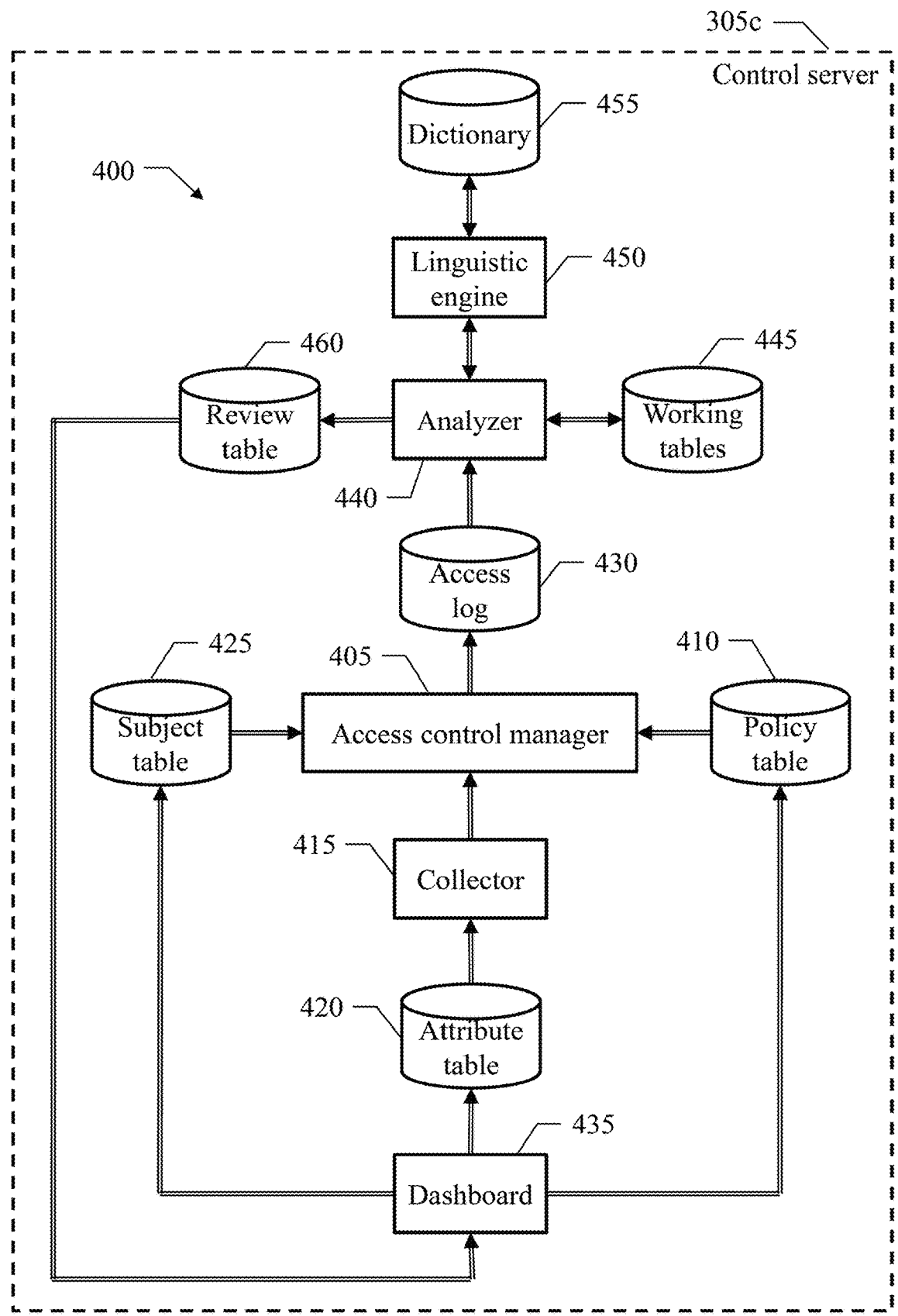
FIG. 4 shows the main software components that may be used to implement the solution according to an embodiment of the present disclosure.

With reference now to FIG. 4, the main software components are that may be used to implement the solution according to an embodiment of the present disclosure.

Particularly, all the software components (programs and data) are typically stored in the mass memory and loaded (at least in part) into the working memory of the control server 305c when the programs are running. The programs are installed into the mass memory, for example, from the removable storage units and/or the network. In this respect, each program may be a module, segment or portion of code, which comprises one or more executable instructions for implementing the specified logical function.

Particularly, the control server 305c runs an IAM applications 400, which implements an access control process (based on the ABAC model) of the objects of the resource servers by the subjects of the clients (not shown in the figure). A commercial example of the IAM application 400 is "IBM Security Identity and Access Manager" by IBM Corporation (trademarks thereof).

The IAM application 400 comprises the following components. An access control manager 405 implements the functionalities of the IAM application 400. Particularly, the access control manager 405 interfaces with the clients and the resource servers to implement an authorization functionality (to specify entailments of the subjects and to enforce the access to the objects by the subjects in compliance therewith). For this purpose, the access control manager 405 accesses (in read mode) a policy repository 410 and it exploits a collector 415. The policy repository 410 defines the (provisioning) policies. For example, the policy repository 410 comprises an entry for each policy; the policy indicates a permission (granting/denying an access type for performing an activity on an object) depending on a result of a script (such as granting or denying the access type when asserted or deasserted, respectively). The script is based on one or more attributes, such as in the form of variables (like isMgr) or name/value pairs (like location=IT, dept=sales); the attributes may relate to the objects (for example, type, location, classification and so on), to the subjects (for example, responsibilities, duties, competences, department and so on), to the activities (for example, read, write, delete, approve and so on) and/or to a situation (for example, date, time and so on). The collector 415 exploits one or more services (for example, LDAP servers, RDBM servers and so on) for collecting the attributes (i.e., their values). The collector 415 accesses (in read mode) an attribute repository 420, which indicates how to collect the attributes. For example, the attribute repository 420 comprises an entry for each attribute. The entry stores instructions for evaluating the attribute, and particularly for collecting corresponding information (such as a remote command, a query and so on) and for using it to define the value of the attribute. The access control manager 405 interfaces with the clients further to implement an authentication functionality (to associate each user with a digital identity used to verify his/her identity). For this purpose, the access control manager 405 accesses (in read mode) a subject repository 425. The subject repository 415 defines the subjects. For example, the subject repository 425 comprises an entry for each subject. The entry stores identification information (such as name, department, job and so on) and authentication information (such as UserId and password) of the subject. The access control manager 405 also implements an audit functionality (to track the granted/denied accesses). For this purpose, the access control manager 405 accesses (in write mode) an access log 430 and its interfaces (indirectly) with a dashboard 435. The access log 430 saves information about the requests to access the objects (access requests) that have been submitted over time. For example, the access log 430 comprises an entry for each access request; the entry stores a time stamp of the submission, the access type, the subject, the attributes of the subject used to evaluate the corresponding policy and the result (granted/denied) of the access request. The dashboard 435 exposes a Graphical User Interface (GUI) for reviewing the access control process. Particularly, the dashboard 435 may be used by a reviewer (or more) to re-certificate the granted accesses (by approving/revoking them), to generate a re-certification report of a result of the re-certification for submission to an auditor (or more) and to update the policies according to a result of the re-certification. The dashboard 435 accesses (in write mode) the policy repository 410, the attribute repository 420 and the subject repository 420.

In the solution according to an embodiment of the present disclosure, the IAM application 400 further comprises the following components. An analyzer 440 assigns the virtual roles to the subjects. The analyzer 440 accesses (in read mode) the access log 430 and it accesses (in read/write mode) one or more working tables 445 storing intermediate data used to assign the virtual roles to the subjects, for example, the above-mentioned counter table, relevance table, spreading table, commonality table and role table. The analyzer 440 exploits a linguistic engine 450, which determines the virtual labels of the virtual roles. The linguistic engine 450 accesses (in read/write mode) a dictionary repository 455, which provides the expressions (in natural language) for the attributes being known. For example, the dictionary repository 455 comprises an entry for each attribute whose expression is known (storing them the attribute and its expression). The analyzer 440 further accesses (in write mode) a review table 460, which indicates (augmented) information for the review of the access control process. For example, the review table 460 comprises an entry for each granted access; the entry stores the access type of the granted access, the subject to which the granted access has been granted, the virtual role of the subject and a review flag indicating a result of the review of the granted access (review result), i.e., asserted (such as to the value 1) when the granted access has been approved or deasserted (such as to the value 0) when the granted access has been revoked. The review table 460 is further accessed (in read/write mode) by the dashboard 435.

Figure 5A:
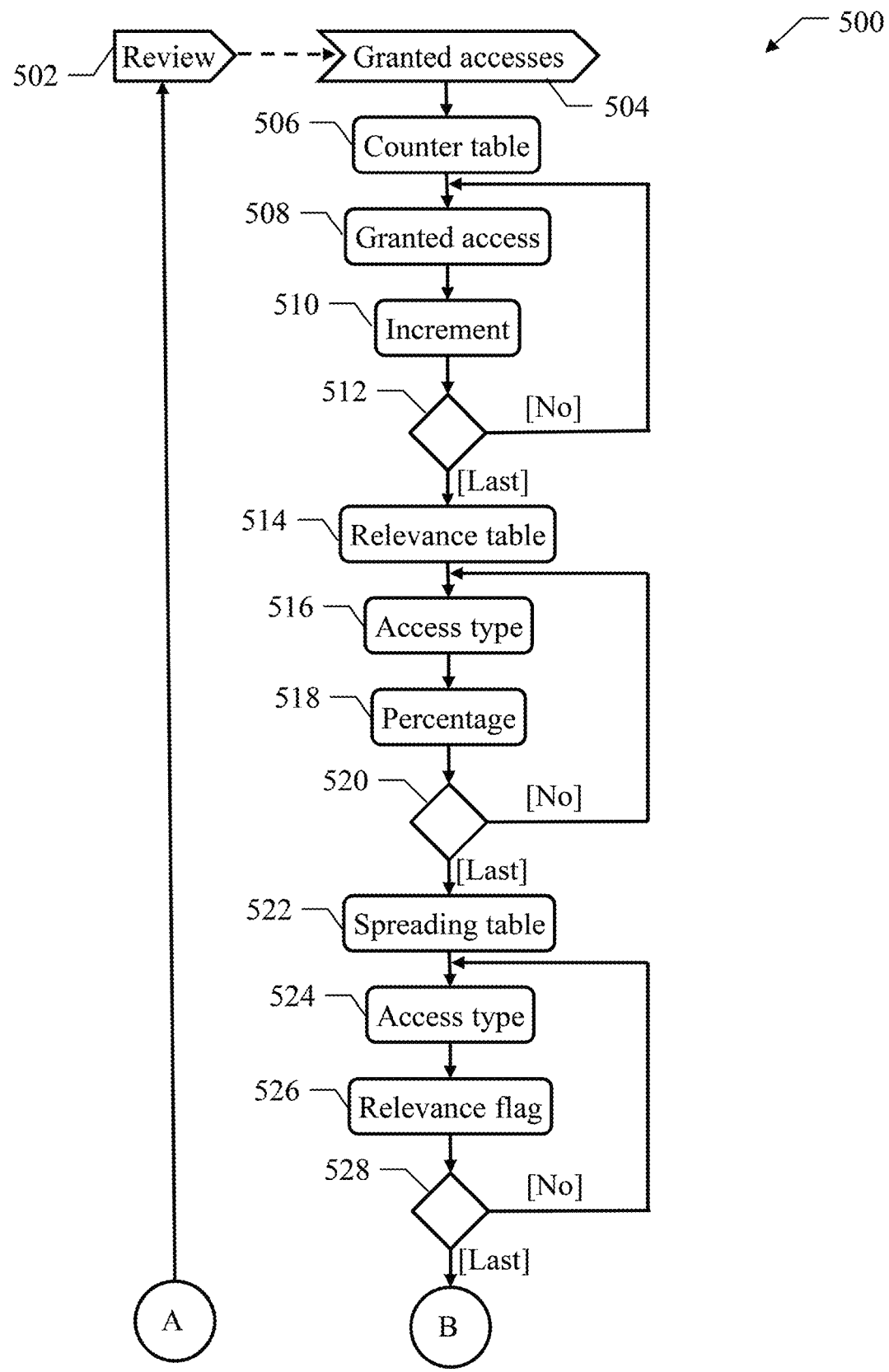
FIG. 5A-FIG. 5C show an activity diagram describing the flow of activities relating to an implementation of the solution according to an embodiment of the present disclosure.
Figure 5B:
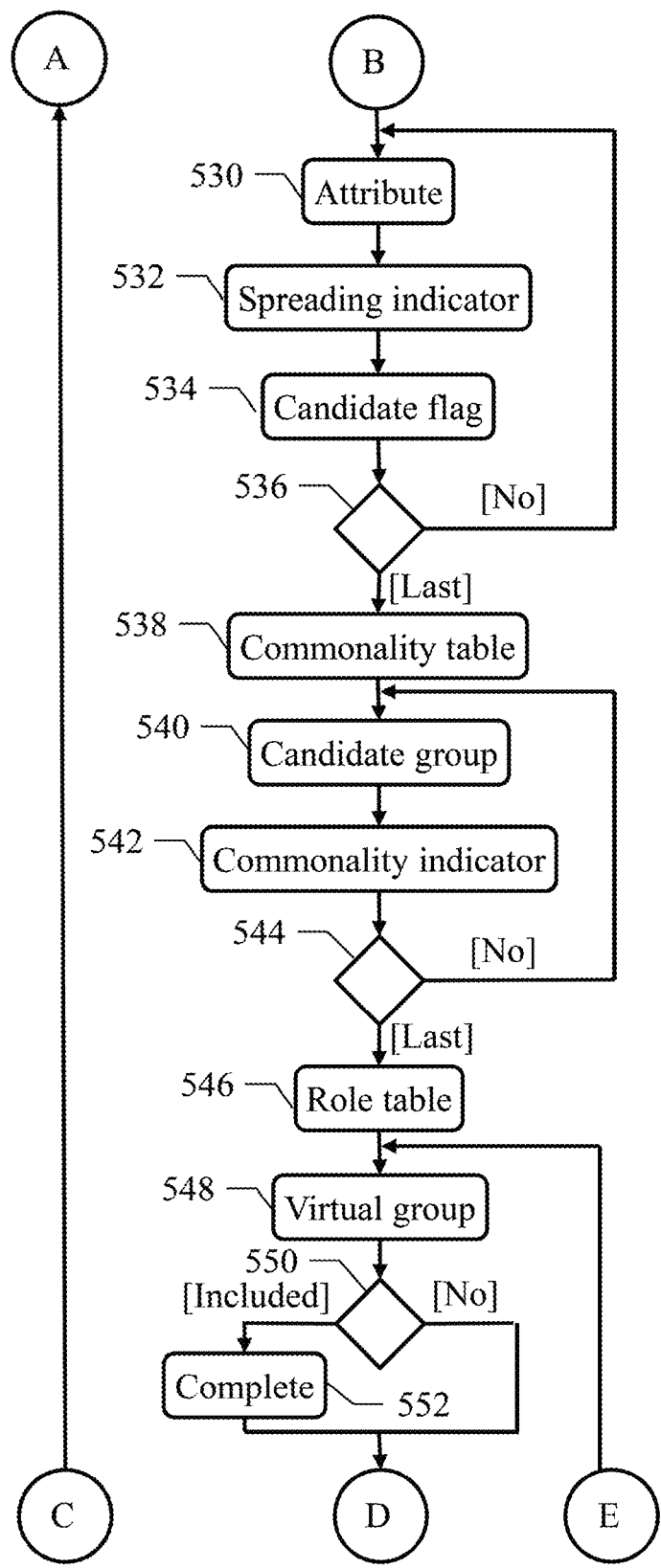
Figure 5C:
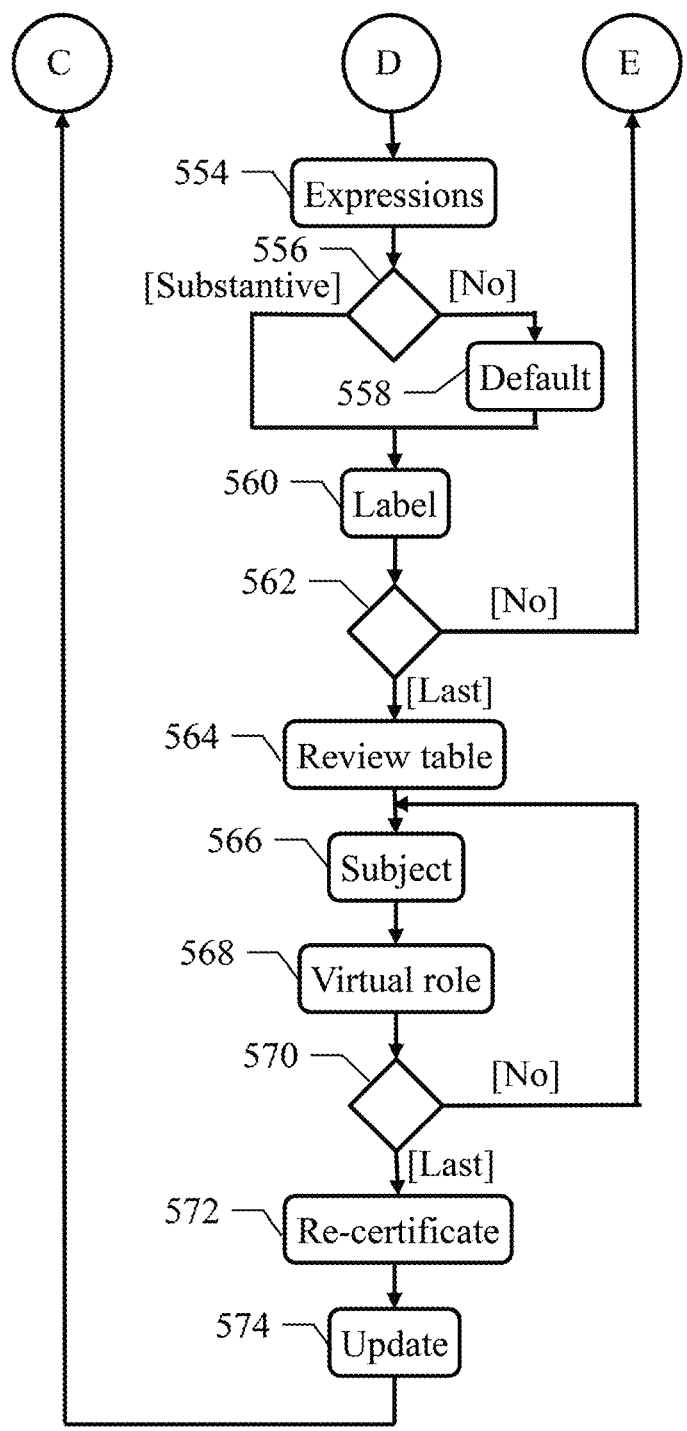

With reference now to FIG. 5A-FIG. 5C, an activity diagram is shown describing the flow of activities relating to an implementation of the solution according to an embodiment of the present disclosure.

Particularly, the activity diagram represents an exemplary process that may be used to review the access control process with a method 500. In this respect, each block may correspond to one or more executable instructions for implementing the specified logical function on each workstation.

The process passes from block 502 to block 504 in response to a request of reviewing the access control process, entered into the dashboard via a corresponding command (for example, periodically or whenever necessary, such as in case of an audit). In response thereto, the analyzer retrieves information about a bunch of granted accesses from the corresponding repository (for example, relating to the last 3-6 months). The analyzer at block 506 determines the access types and the attributes of all the granted accesses; the analyzer then creates the counter table with the rows for the attributes and the columns for the access types, and it initializes all its occurrence counters to 0. A loop is then entered for populating the counter table. The loop begins at block 508, wherein the analyzers takes a (current) granted access into account (starting from a first one in any arbitrary order). The analyzer at block 510 increments (by 1) the occurrence counter of each attribute of the subject that has been granted the access type of the granted access (in the corresponding column). A test is made at block 512, wherein the analyzer verifies whether a last granted access has been processed. If not, the flow of activity returns to block 508 to repeat the same operations on a next granted access. Conversely (once all the granted accesses have been processed), the loop is exit by descending into block 514.

At this point, the analyzer creates the relevance table with the rows for the attributes and the columns for the access types as above. A loop is then entered for populating the relevance table. The loop begins at block 516, wherein the analyzers takes a (current) access type into account (starting from a first one in any arbitrary order). The analyzer then calculates a total counter of the occurrence counters of the access type (in the corresponding column of the counter table). The analyzer at block 518 sets the relevance indicator of each attribute for the access type (in the corresponding column) to its occurrence counter (in the same cell of the counter table) divided by the total counter of the access type. A test is made at block 520, wherein the analyzer verifies whether a last access type has been processed. If not, the flow of activity returns to block 516 to repeat the same operations on a next access type. Conversely (once all the access types have been processed), the loop is exit by descending into block 522.

At this point, the analyzer creates the spreading table with the rows for the attributes and the columns for the access types as above plus the additional columns for the spreading indicators and the candidate flags. A loop is then entered for populating the spreading table. The loop begins at block 524, wherein the analyzers takes a (current) access type into account (starting from a first one in any arbitrary order). The analyzer determines the highest relevance indicator of the attributes for the access type (in the corresponding column of the relevance table) and then calculates the relevance threshold of the access type as a percentage of this highest relevance indicator (for example, 50-80%, such as 75% thereof). The analyzer at block 526 sets the relevance flag of each attribute for the access type (in the corresponding column) to asserted when its relevance indication (in the same cell of the relevance table) is, possibly strictly, higher than the relevance threshold of the access type, or to deasserted otherwise. A test is made at block 528, wherein the analyzer verifies whether a last access type has been processed. If not, the flow of activity returns to block 524 to repeat the same operations on a next access type. Conversely (once all the access types have been processed), the loop is exit by descending into block 530. At this point, a further loop is entered for completing the spreading table. The loop begins with the analyzers that takes a (current) attribute into account (starting from a first one in any arbitrary order). The analyzer at block 532 sets the spreading indicator of the attribute equal to the number of access types for which the attribute is relevant, as indicated by the relevance flags of the attribute for the access types being asserted (in the corresponding row of the spreading table) divided by the total number of access types. The analyzer at block 534 sets the candidate flag of the attribute to asserted when its spreading indicator is, possibly strictly, higher than the spreading threshold, or to deasserted otherwise. A test is made at block 536, wherein the analyzer verifies whether a last attribute has been processed. If not, the flow of activity returns to block 530 to repeat the same operations on a next attribute.

Conversely (once all the attributes have been processed), the loop is exit by descending into block 538.

At this point, the analyzer creates the commonality table with the rows for the candidate groups, equal to all the possible subsets having a cardinality higher than 1 of the candidate attributes (whose candidate flags in the spreading table are asserted), in the number $2^{CA}$-CA-1, where CA is the number of the candidate attributes. A loop is then entered for populating the commonality table. The loop begins at block 540, wherein the analyzers takes a (current) candidate group into account (starting from a first one in any arbitrary order). The analyzer at block 542 sets the commonality indicator of the candidate group to the number of access types for which all the attributes of the candidate group are relevant, as indicated by their relevance flags being asserted (in the same column for all the corresponding rows in the spreading table) divided by the total number of access types. A test is made at block 544, wherein the analyzer verifies whether a last candidate group has been processed. If not, the flow of activity returns to block 540 to repeat the same operations on a next candidate group. Conversely (once all the candidate groups have been processed), the loop is exit by descending into block 546.

At this point, the analyzer creates the role table with the rows for the virtual roles. The virtual roles are defined by the virtual groups equal to the candidate attributes alone (whose candidate flags in the spreading table are asserted) and by the candidate groups having their commonality indicators (in the spreading table) that are (possibly strictly) higher than the commonality threshold. A loop is then entered for populating the role table. The loop begins at block 548, wherein the analyzers takes a (current) virtual group into account (starting from a first one in any arbitrary order). The analyzer at block 550 verifies whether the (smaller) virtual group has all its attributes comprised in any other (bigger) virtual group. If so, the analyzer at block 552 completes the smaller virtual group by adding the negation of each attribute of the bigger virtual groups not already comprised in it. The process then descends into block 554; the same point is also reached directly from the block 550 if the virtual group has not all its attributes comprised in any other virtual group. In both cases, the linguistic engine now determines the expression (in natural language) corresponding to each attribute of the virtual group. For this purpose, the linguistic engine at first looks for the attribute in the dictionary repository. If the attribute is found, the corresponding expression is retrieved from the dictionary repository. Conversely, the linguistic engine interrogates one or more remote services (for example, in the Internet) for the expression corresponding to the attribute. In case of a positive response, the expression is set to the obtained response and the dictionary repository is updated accordingly. Conversely, the linguistic engine prompts the reviewer to enter the expression for the attribute manually and it updates the dictionary repository accordingly. The linguistic engine then sets the virtual label to a combination of the expressions of all the attributes of the virtual group (for example, adjectives followed by substantives). A test is made at block 556, wherein the linguistic engine verifies whether the virtual label so obtained contains at least one substantive. If not, the linguistic engine at block 558 adds the default substantive to the virtual label. The process then descends into block 560; the same point is also reached directly from the block 556 is the virtual label so obtained already contains one or more substantive. In both cases, the analyzer now prompts the reviewer to confirm the virtual label so obtained (with the possibility of modifying it if necessary) and then saves the (possibly modified) virtual label into the corresponding cell of the role repository. A test is now made at block 562, wherein the analyzer verifies whether a last virtual role has been processed. If not, the flow of activity returns to block 548 to repeat the same operations on a next virtual role. Conversely (once all the virtual roles have been processed), the loop is exit by descending into block 564.

At this point, the analyzer creates the review table with the rows for the granted accesses. The analyzer populates the review table by adding, for each granted access, its access type and the subject to which it has been granted. A loop is then entered at block 566, wherein the analyzers takes a (current) subject into account (starting from a first one in any arbitrary order). The analyzer at block 568 determines the virtual role of the subject; the subject is assigned the virtual role, if any, for which the subject has all the attributes of the corresponding virtual group. The analyzer then saves the virtual role of the subject into all the corresponding rows of the review table. A test is now made at block 570, wherein the analyzer verifies whether a last subject has been processed. If not, the flow of activity returns to block 566 to repeat the same operations on a next subject. Conversely (once all the subjects have been processed), the loop is exit by descending into block 572. At this point, the dashboard displays a review window (according to the content of the review table) for prompting the reviewer to re-certificate the granted accesses; as soon as the reviewer re-certificates each granted access (by selecting the push-button for accepting or revoking it), the dashboard updates its review flag accordingly (in the corresponding cell). If it is necessary, the reviewer at block 574 may further use the dashboard to update the policies (in the corresponding repository) to make them compliant with the result of the re-certification (i.e., to avoid granting the access types to the subjects for which they have been revoked). The process then returns to the block 502 waiting for a next review of the access control process.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for reviewing a control of access to one or more objects of an information technology system by one or more subjects. However, the information technology system may be of any type (for example, comprising any number of physical/virtual machines communicating over any local, wide area, global, cellular or satellite network by exploiting any type of wired and/or wireless connections, with a stand-alone architecture and so on). The information technology system may have any number and type of objects (for example, partial, different or additional objects with respect to the ones mentioned above) whose access has to be controlled for any number and type of subjects (for example, users, programs, services and so on); the access control may be of any type (for example, for permitting/prohibiting partial, different or additional activities with respect to the ones mentioned above, requesting further actions, such as entering a second level password, and so on).

In an embodiment, the method comprises the following steps under the control of a computing system. However, the computing system may be of any type (see below).

In an embodiment, the method comprises retrieving (by the computing system) an indication of granted accesses to the objects being granted to the subjects. However, the granted accesses may be in any number and they may be retrieved in any way (for example, extracted from a log, monitored continuously, with reference to any period and so on).

In an embodiment, the granted accesses are granted according to one or more policies for granting corresponding access types. However, the policies may be in any number and of any type (for example, scripts, expressions and so on); the policies may grant any number and type of accesses (for example, each enabling or prohibiting partial, different or additional activities with respect to the ones mentioned above on one or more objects).

In an embodiment, the policies are for granting the corresponding access types according to one or more attributes of the subjects. However, the policies may be based on any number and type of attributes of the subjects (for example, partial, different or additional attributes with respect to the ones mentioned above); in any case, the policies may further be based on attributes relating to the objects, the activities, the context and so on.

In an embodiment, the method comprises determining (by the computing system) one or more virtual roles defined by corresponding virtual groups each of one or more of the attributes. However, the virtual groups may be in any number and each comprising any number of attributes; moreover, the virtual roles may be defined in any way according to their virtual groups (for example, by virtual labels determined from the attributes of the virtual groups, simply by the attributes of the virtual groups and so on).

In an embodiment, the virtual groups are determined according to a correlation among the access types and the attributes of the subjects being granted the corresponding granted accesses. However, the virtual groups may be determined in any way (for example, by combining the attributes according to commonalities of the corresponding access types, applying clustering algorithms, using artificial intelligence techniques and so on) among any attributes (for example, all the attributes, only the attributes relevant to the access types and so on).

In an embodiment, the method comprises outputting (by the computing system) review information. However, the review information may be output in any way (for example, displayed, printed, transmitted remotely and so on).

In an embodiment, the review information comprises an indication of the virtual roles with the access types of the corresponding grated accesses. However, the review information may be of any type. For example, the review information may list the virtual roles and, for each of them, the access types being granted to the subjects belonging thereto. In addition, or in alternative, the review information may list the subjects and, for each of them, its virtual role(s) and possibly the access types being granted thereto. In addition, or in alternative, the review information may list the subjects and, for each of them, the access types being granted thereto and, for each of them, the virtual role according to which the corresponding granted accesses have been granted to the subject.

In an embodiment, the review information is output for use to review the policies according thereto. However, the review information may be used for any purpose (for example, updating, reporting, auditing and so on).

Further embodiments provide additional advantageous features, which may however be omitted at all in a basic implementation.

Particularly, in an embodiment the method comprises assigning (by the computing system) one or more of the virtual roles to each of at least part of the subjects, the subject being assigned each of the virtual roles for which the subject has all the attributes of the corresponding virtual group. However, the virtual roles may be assigned to the subjects in any way (for example, at most one when the virtual roles are determined in general so as to be disjoint, one or more when the virtual roles are determined for each access type, and so on).

In an embodiment, the method comprises outputting (by the computing system) the review information comprising an indication of the subjects and, for each of the subjects, an indication of the corresponding virtual roles and of the access types of the corresponding granted accesses. However, the subjects may be indicated in any way (for example, by their UserIds, names and so on) and their virtual roles and access types may be provided in any way (for example, listed for each subject, shown when hovering the mouse over it, accessible via a context menu and so on).

In an embodiment, the method comprises calculating (by the computing system) corresponding relevance indicators of the attributes for each of the access types, each of the relevance indicators being calculated according to the granted accesses of the corresponding access type being granted to the subjects having the corresponding attribute. However, each relevance attribute may be calculated in any way (for example, equal to a percentage of the granted accesses of the access type being granted to the subjects having the attribute, equal to their number and so on).

In an embodiment, the method comprises selecting (by the computing system) relevant one or more of the attributes for each of the access types according to the relevance indicators of the attributes for the access type. However, the relevant attributes of each access type may be selected in any way (for example, according to a comparison of the relevance indicators with a relevance threshold depending on the relevance indicators or pre-defined, selecting the relevance indicators indicative of a higher relevance in a pre-defined number, and so on).

In an embodiment, the method comprises determining (by the computing system) the virtual groups only according to the relevant attributes. However, the possibility is not excluded of determining the virtual groups according to any other set of attributes (for example, all the attributes indiscriminately, a sub-set thereof selected manually and so on).

In an embodiment, the method comprises calculating (by the computing system) corresponding relevance thresholds of the access types, each of the relevance thresholds being calculated according to the relevance indicators of the attributes for the corresponding access type. However, each of the relevance threshold may be calculated in any way (for example, as a pre-defined percentage of the relevance indicator indicative of the highest relevance for the access type, of an average of the relevance indicators for the access type and so on).

In an embodiment, the method comprises selecting (by the computing system) the relevant attributes for each of the access types according to a comparison of the relevance indicators of the attributes for the access type with the relevance threshold of the access type. However, the relevant attributes for each access type may be determined in any way according to this comparison (for example, all the ones that are (possibly strictly) higher/lower than the relevance threshold, up to a maximum number and so on).

In an embodiment, the method comprises calculating (by the computing system) each of the relevance indicators according to a comparison of the granted accesses of the corresponding access type being granted to the subjects having the corresponding attribute with respect to all the granted accesses of the corresponding access type. However, each relevance indicator may be calculated in any way according to this comparison (for example, as a percentage of the granted accesses of the access type being granted to the subjects having the attribute with respect to their total for all the attributes of the access type, with respect to all the granted accesses of the access type, and so on).

In an embodiment, the method comprises calculating (by the computing system) corresponding spreading indicators of the attributes, each of the spreading indicators being calculated according to the access types comprising the corresponding attribute in the relevant attributes thereof. However, each spreading indicator may be calculated in any way (for example, according to a comparison of the access types for which the corresponding attribute is relevant with respect to all the access types, as their number and so on).

In an embodiment, the method comprises selecting (by the computing system) candidate one or more of the attributes according to the spreading indicators thereof. However, the candidate attributes may be selected in any way (for example, according to a comparison with a threshold, selecting the spreading indicators indicative of a higher spreading in a pre-defined number, and so on).

In an embodiment, the method comprises determining (by the computing system) the virtual groups only among the subsets of the candidate attributes. However, the possibility is not excluded of determining the virtual groups among any other subsets of the attributes (for example, among all the relevant attributes, all the attributes and so on).

In an embodiment, the method comprises calculating (by the computing system) each of the spreading indicators according to a comparison of the access types comprising the corresponding attribute in the relevant attributes thereof with respect to all the access types. However, each spreading indicator may be calculated in any way according to this comparison (for example, as a percentage of the access types comprising the corresponding attribute in the relevant attributes thereof with respect to all the access types, as a percentage of the granted accesses of the access types comprising the corresponding attribute in the relevant attributes thereof with respect to all the granted accesses and so on).

In an embodiment, the method comprises selecting (by the computing system) the candidate attributes according to a comparison of the spreading indicators with a spreading threshold. However, the candidate attributes may be determined in any way according to this comparison (for example, all the ones that are (possibly strictly) higher/lower than the spreading threshold, up to a maximum number and so on); moreover, the spreading threshold may be determined in any way (for example, pre-defined, depending on the spreading indicators and so on).

In an embodiment, the method comprises calculating (by the computing system) corresponding commonality indicators of candidate groups defined by the subsets of the candidate attributes having a cardinality higher than one, each of the commonality indicators being calculated according to the access types comprising all the candidate attributes of the corresponding candidate group in the relevant attributes thereof. However, each commonality indicator may be calculated in any way (for example, according to a comparison of the common access types of the corresponding attributes with respect to all the access types, as their number and so on).

In an embodiment, the method comprises selecting (by the computing system) the virtual groups among the candidate groups according to the commonality indicators thereof. However, the virtual groups may be selected among the candidate groups in any way (for example, according to a comparison with a threshold, selecting the commonality indicators indicative of a higher commonality in a pre-defined number, and so on).

In an embodiment, the method comprises adding (by the computing system) the subsets of the candidate attributes having a cardinality equal to one to the virtual groups. However, the possibility is not excluded to add any other subsets having single cardinality to the virtual groups (for example, for all the candidate attributes, all the relevant attributes, all the attributes and so on), down to none.

In an embodiment, the method comprises calculating (by the computing system) each of the commonality indicators according to a comparison of the access types comprising all the candidate attributes of the candidate group in the relevant attributes thereof with respect to all the access types. However, each commonality indicator may be calculated in any way according to this comparison (for example, as a percentage of the access types comprising all the candidate attributes of the candidate group in the relevant attributes thereof with respect to all the access types, as a percentage of the granted accesses of the access types comprising all the candidate attributes of the candidate group in the relevant attributes thereof with respect to all the granted accesses and so on).

In an embodiment, the method comprises selecting (by the computing system) the candidate groups according to a comparison of the commonality indicators with a commonality threshold. However, the virtual groups may be determined in any way according to this comparison (for example, all the ones that are (possibly strictly) higher/lower than the commonality threshold, up to a maximum number and so on); moreover, the commonality threshold may be determined in any way (for example, pre-defined, depending on the commonality indicators and so on).

In an embodiment, the method comprises completing (by the computing system) each smaller one of the virtual groups (having a cardinality lower than a maximum cardinality of the virtual groups) before determining the corresponding virtual roles. However, this operation may be omitted at all (for example, when the virtual roles may be non-disjoint, such as when each subject is assigned corresponding virtual roles for the access types being granted thereto).

In an embodiment, the smaller virtual group is completed by adding, for each bigger one of the virtual groups having a cardinality higher than the cardinality of the smaller virtual group and comprising all the attributes of the smaller virtual group, a negation of the attributes of the bigger virtual group different from the attributes of the smaller virtual group. However, the smaller virtual group may be completed in any way (for example, by negating variables, values and so on).

In an embodiment, the method comprises assigning (by the computing system) corresponding virtual labels to the virtual roles according to the attributes of the corresponding virtual groups. However, the virtual labels may be determined in any way (for example, automatically, semi-automatically with manual confirmation, manually and so on).

In an embodiment, the method comprises outputting (by the computing system) the review information comprising an indication of the virtual labels of the virtual roles. However, the virtual labels may be output in any way (for example, in place of the virtual groups, in addition thereto and so on).

In an embodiment, the method comprises determining, by the computing system, each of the virtual labels according to corresponding expressions in natural language for the attributes of the corresponding virtual group. However, the expressions may be determined in any way (for example, by querying one or more local/remote dictionaries, either pre-defined or populated incrementally, exploiting one or more remote services, entered manually and so on); moreover, each virtual label may be determined in any way according to the corresponding expressions (for example, by combining them automatically, semi-automatically, manually and so on).

In an embodiment, the method comprises adding (by the computing system) a default substantive to each of the virtual labels comprising no substantive. However, the default substantive may be of any type (for example, pre-defined, entered manually and so on).

In an embodiment, the method comprises receiving (by the computing system) corresponding approvals or revocations of the access types of the granted accesses in response to the outputting of the review information. However, the approvals/revocations may be received in any way (for example, in interactive mode, in batch mode and so on).

In an embodiment, the method comprises updating (by the computing system) at least part of the policies according to the access types being revoked. However, the policies may be updated in any way (for example, for preventing unauthorized accesses, deleting stale policies, removing dormant/orphan subjects and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises a computer readable storage medium that has program instructions embodied therewith; the program instructions are executable by a computing system to cause the computing system to perform the same method. However, the computer program may be implemented as a stand-alone module, as a plug-in for a pre-existing software program (for example, an IAM application) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may be of any type (for example, one or more physical/virtual machines, a static or dynamic combination thereof, such as in a cloud computing environment, either the same as or different from the one used to control the access to the objects by the subjects, and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device for a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for access control, the method comprising:
retrieving accesses granted to one or more subjects, wherein the accesses are granted according to one or more policies based on one or more attributes of the one or more subjects;
calculating a relevance indicator for each of the one or more attributes, wherein one or more relevance indicators are calculated based on a comparison of an access type granted to the one or more subjects and the one or more attributes of the one or more subjects;
creating one or more virtual groups by selecting at least one of the one or more attributes belonging to each of the one or more subjects with a same access type, wherein the at least one of the one or more attributes is selected based on the relevance indicator calculated for each of the one or more attributes;
assigning a label, using a linguistic engine, to each of the one or more virtual groups, wherein the linguistic engine searches a dictionary repository or interrogates one or more remote services based on each of the one or more attributes; and
displaying a review window to a reviewer, the review window being comprised of a list of a plurality of subjects, a corresponding assigned label, and a list of the access types granted to each of the plurality of subjects.

2. The method of claim 1, further comprising:
assigning one or more virtual roles to at least one of the one or more subjects, wherein the one or more virtual roles are assigned to the at least one subject having all the attributes of a corresponding virtual group; and outputting review information, wherein the review information includes the one or more virtual roles and the access types for each of the one or more subjects.

3. The method of claim 1, further comprising:
calculating a relevance threshold for the access types using the relevance indicator of the one or more attributes for each of the access types;
selecting one or more relevant attributes for each of the access types, wherein the one or more relevant attributes are selected based on a comparison of the one or more relevance indicators for the one or more attributes for the access types and the relevance threshold for the access types; and
calculating the relevance indicator for each of the one or more attributes based on the attributed of the one or more subjects within the accesses type.

4. The method of claim 1, further comprising:
calculating a spreading indicator, wherein the spreading indicator is calculated for each of the one or more attributes of the one or more virtual groups;
selecting two or more candidates from at least one virtual group of the one or more virtual groups, wherein the two or more candidates are selected from the at least one virtual group if the spreading indicator between the one or more attributes of the two or more candidates equals or exceeds a spreading threshold;
calculating one or more commonality indicators between the two or more candidates selected from the at least one virtual group, wherein the one or more commonality indicators are calculated between each of the one or more access types of the two or more candidates; and
determining a candidate group, wherein the candidate group includes at least two or more candidates, and wherein the two or more candidates of the candidate group exceed a commonality threshold, the commonality threshold being a cardinality greater than one.

5. The method of claim 1, further comprising:
identifying a smaller virtual group, wherein the smaller virtual group is identified within the one or more virtual groups based on a cardinality, and wherein the cardinality of the smaller group is less than a maximum cardinality of a corresponding virtual group in which the one or more smaller groups is identified; and
completing the smaller virtual group, wherein the smaller virtual group is completed by adding a negation of an attribute to the virtual group, wherein the negation of the attribute added to the virtual group corresponds to one of the one or more attributes of the smaller group being completed.

6. The method of claim 1, further comprising:
prompting a recertification process within a dashboard of the review window, wherein the recertification process requires the reviewer to re-certify the accesses granted to each of the subject on the list of the plurality of subjects using one or more pushbuttons within the review window based on at least the corresponding assigned label and the list of access types granted to each of the plurality of subjects on the list, wherein the one or more pushbuttons enable the reviewer to accept or revoke access for each of the plurality of subjects;
updating automatically a review flag corresponding to the accesses granted to each of the plurality of subjects on the list throughout the recertification process; and
updating the one or more policies in the dashboard of the review window such that the one or more policies are compliant with the recertification process conducted by the reviewer.

7. The method of claim 1, wherein an access control manager is utilized in displaying the review window to the reviewer and communicating with one or more resource servers, and wherein the access control manager includes at least, one or more of, a policy repository, an attribute repository, or a subject repository which may be accessed by the control manager utilizing a collector.

8. The method of claim 1, wherein assigning the label further comprises:
combining, using the linguistic engine, one or more expressions retrieved based on the search of each of the one or more attributes, wherein the label assigned to each of the one or more virtual groups is a combination of the one or more expressions corresponding to the one or more attributes belonging to each of the one or more subjects with the same access type.

9. The method of claim 8, wherein the linguistic engine verifies whether the label for each of the one or more virtual groups includes a substantive, and wherein the linguistic engine adds a default substantive to each label without a substantive.

10. A computer system for access control, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
retrieving accesses granted to one or more subjects, wherein the accesses are granted according to one or more policies based on one or more attributes of the one or more subjects;
calculating a relevance indicator for each of the one or more attributes, wherein one or more relevance indicators are calculated based on a comparison of an access type granted to the one or more subjects and the one or more attributes of the one or more subjects;
creating one or more virtual groups by selecting at least one of the one or more attributes belonging to each of the one or more subjects with a same access type, wherein the at least one of the one or more attributes is selected based on the relevance indicator calculated for each of the one or more attributes;
assigning a label, using a linguistic engine, to each of the one or more virtual groups, wherein the linguistic engine searches a dictionary repository or interrogates one or more remote services based on each of the one or more attributes; and
displaying a review window to a reviewer, the review window being comprised of a list of a plurality of subjects, a corresponding assigned label, and a list of the access types granted to each of the plurality of subjects.

11. The computer system of claim 10, further comprising:
assigning one or more virtual roles to at least one of the one or more subjects, wherein the one or more virtual roles are assigned to the at least one subject having all the attributes of a corresponding virtual group; and
outputting review information, wherein the review information includes the one or more virtual roles and the access types for each of the one or more subjects.

12. The computer system of claim 10, further comprising:
calculating a relevance threshold for the access types using the relevance indicator of the one or more attributes for each of the access types;

selecting one or more relevant attributes for each of the access types, wherein the one or more relevant attributes are selected based on a comparison of the one or more relevance indicators for the one or more attributes for the access types and the relevance threshold for the access types; and calculating the relevance indicator for each of the one or more attributes based on the attributed of the one or more subjects within the accesses type.

13. The computer system of claim 10, further comprising:

calculating a spreading indicator, wherein the spreading indicator is calculated for each of the one or more attributes of the one or more virtual groups;

selecting two or more candidates from at least one virtual group of the one or more virtual groups, wherein the two or more candidates are selected from the at least one virtual group if the spreading indicator between the one or more attributes of the two or more candidates equals or exceeds a spreading threshold;

calculating one or more commonality indicators between the two or more candidates selected from the at least one virtual group, wherein the one or more commonality indicators are calculated between each of the one or more access types of the two or more candidates; and determining a candidate group, wherein the candidate group includes at least two or more candidates, and wherein the two or more candidates of the candidate group exceed a commonality threshold, the commonality threshold being a cardinality greater than one.

14. The computer system of claim 10, further comprising:

identifying a smaller virtual group, wherein the smaller virtual group is identified within the one or more virtual groups based on a cardinality, and wherein the cardinality of the smaller group is less than a maximum cardinality of a corresponding virtual group in which the one or more smaller groups is identified; and completing the smaller virtual group, wherein the smaller virtual group is completed by adding a negation of an attribute to the virtual group, wherein the negation of the attribute added to the virtual group corresponds to one of the one or more attributes of the smaller group being completed.

15. A computer program product for access control, comprising:

one or more non-transitory computer-readable storage media and program instructions stored on at least one of the one or more tangible storage media, the program instructions executable by a processor to cause the processor to perform a method comprising:

retrieving accesses granted to one or more subjects, wherein the accesses are granted according to one or more policies based on one or more attributes of the one or more subjects;

calculating a relevance indicator for each of the one or more attributes, wherein one or more relevance indicators are calculated based on a comparison of an access type granted to the one or more subjects and the one or more attributes of the one or more subjects;

creating one or more virtual groups by selecting at least one of the one or more attributes belonging to each of the one or more subjects with a same access type, wherein the at least one of the one or more attributes is selected based on the relevance indicator calculated for each of the one or more attributes;

assigning a label, using a linguistic engine, to each of the one or more virtual groups, wherein the linguistic engine searches a dictionary repository or interrogates one or more remote services based on each of the one or more attributes; and displaying a review window to a reviewer, the review window being comprised of a list of a plurality of subjects, a corresponding assigned label, and a list of the access types granted to each of the plurality of subjects.

16. The computer program product of claim 15, further comprising:

assigning one or more virtual roles to at least one of the one or more subjects, wherein the one or more virtual roles are assigned to the at least one subject having all the attributes of a corresponding virtual group; and outputting review information, wherein the review information includes the one or more virtual roles and the access types for each of the one or more subjects.

17. The computer program product of claim 15, further comprising:

identifying a smaller virtual group, wherein the smaller virtual group is identified within the virtual groups based on a cardinality, and wherein the cardinality of the smaller group is less than a maximum cardinality of the virtual group in which the one or more smaller groups is identified; and completing the smaller virtual group, wherein the smaller virtual group is completed by adding a negation of an attribute to the virtual group, wherein the negation of the attribute added to the virtual group corresponds to one of the one or more attributes of the smaller group being completed.

18. The computer program product of claim 15, further comprising:

receiving a revocation of the accesses granted to the one or more subjects in response to the outputting of the review information; and updating the one or more policies based on the revocation of the access granted to the one or more subjects.

19. The computer program product of claim 15, further comprising:

calculating a relevance threshold for the access types using the relevance indicator of the one or more attributes for each of the access types;

selecting one or more relevant attributes for each of the access types, wherein the one or more relevant attributes are selected based on a comparison of the one or more relevance indicators for the one or more attributes for the access types and the relevance threshold for the access types; and calculating the relevance indicator for each of the one or more attributes based on the attributed of the one or more subjects within the accesses type.

20. The computer program product of claim 15, further comprising:

calculating a spreading indicator, wherein the spreading indicator is calculated for each of the one or more attributes of the one or more virtual groups;

selecting two or more candidates from at least one virtual group of the one or more virtual groups, wherein the two or more candidates are selected from the at least one virtual group if the spreading indicator between the one or more attributes of the two or more candidates equals or exceeds a spreading threshold;

calculating one or more commonality indicators between the two or more candidates selected from the at least one virtual group, wherein the one or more commonality indicators are calculated between each of the one or more access types of the two or more candidates; and determining a candidate group, wherein the candidate group includes at least two or more candidates, and wherein the two or more candidates of the candidate group exceed a commonality threshold, the commonality threshold being a cardinality greater than one.

* * * * *